No. 846,949. PATENTED MAR. 12, 1907.
I. N. RIFE.
NUT LOCK.
APPLICATION FILED JULY 27, 1906.
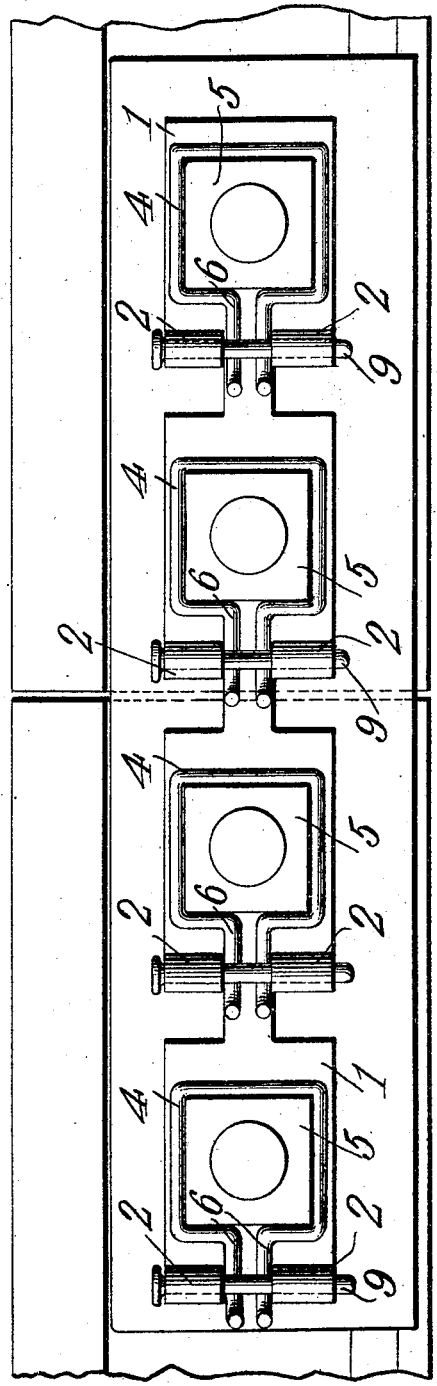
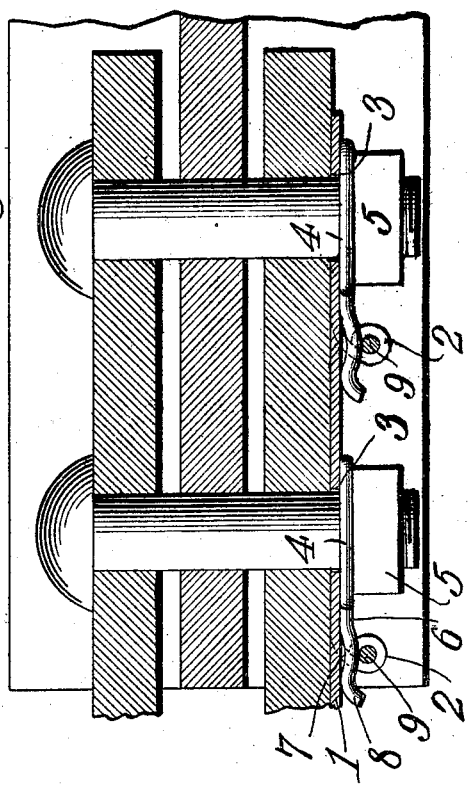
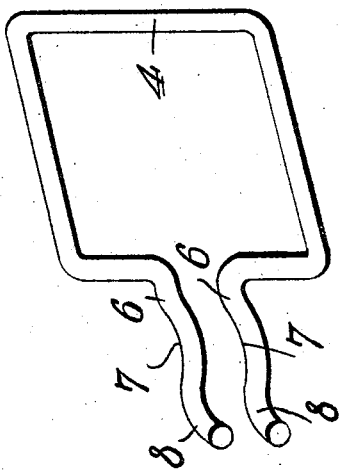
WITNESSES:
Isaac N. Rife, INVENTOR.
By C. A. Snow & Co.
ATTORNEYS

UNITED STATES PATENT OFFICE.

ISAAC N. RIFE, OF COATESVILLE, PENNSYLVANIA.

NUT-LOCK.

No. 846,949.  Specification of Letters Patent.  Patented March 12, 1907.

Application filed July 27, 1906. Serial No. 328,109.

*To all whom it may concern:*

Be it known that I, ISAAC N. RIFE, a citizen of the United States, residing at Coatesville, in the county of Chester and State of Pennsylvania, have invented a new and useful Nut-Lock, of which the following is a specification.

This invention has relation to nut-locks; and it consists in the novel construction and arrangement of its parts, as hereinafter shown and described.

The object of the invention is to provide a nut-lock especially adapted to be applied to the fish-plates of railway-track for the purpose of positively and effectively locking the nuts in position upon the track-bolts.

In the accompanying drawing, Figure 1 is a side elevation of the nut-lock. Fig. 2 is a horizontal sectional view of the same. Fig. 3 is a perspective view of a loop used in the nut-lock.

The nut-lock consists of the plate 1, having formed at its edges the curls 2 2, which are located in vertical alinement with each other and are spaced apart at their inner ends. The said plate 1 is provided with the bolt-perforation 3. The rectangular wire loop 4 is adapted to pass around the sides of the nut 5 and fit snugly against the same. The said loop at one side terminates in the substantially parallel shanks 6, which extend in alinement with the transverse axis of the loop. The said shanks at intermediate points are bowed upwardly, as at 7, and at points near their ends are bowed downwardly, as at 8. The pin 9 passes through the curls 2 2 and over the upward-bowed portions 7 of the said shank 6, which lie in the space between the inner ends of the said curls 2 2. In passing the pin 9 over the said upward-bowed portion 7 of the said shanks the said bows are slightly compressed, and thus the loop 4 is forced into close contact with the side of the plate 1. The said plate is of sufficient length and breadth to engage a flange of the fish-plate and is thus restrained from turning, and, by reason of the fact that the loop 4 is confined at one side and passes around the nut 5, the said loop cannot move independent of the said plate 1 when the pin 9 is in position.

From the foregoing description it is obvious that a locking device for railway-track nuts is provided which is simple, cheap, and effective.

Having described my invention, what I claim as new, and desire to secure by Letters Patent, is—

1. A nut-lock comprising a plate having a bolt-perforation, a bolt passing through said perforation, a nut bearing against the side of the plate and retaining the same against lateral movement, said plate having formed at its edges oppositely-disposed curls which are spaced apart at their inner ends, a metallic loop bearing against the plate and passing around the nut and having at one side parallel shanks located within the space between the inner ends of the said curls, and a pin passing through the curls and bearing against the shanks of the loop.

2. A nut-lock comprising a plate having a bolt-perforation, a bolt passing through said perforation, a nut locked upon the bolt and bearing against the side of the plate and retaining the same against lateral movement, curls formed at the edges of the plate and being oppositely disposed and spaced apart at their inner ends, a loop passing around the nut and having at one side laterally-disposed parallel shanks which pass through the space between said curls, the said shanks at intermediate points being upwardly bowed, a pin passing through said curls and bearing against the upper bow portions of said loop-shanks.

3. A nut-lock comprising a plate having a bolt-perforation, a bolt passing through said perforation, a nut located upon the bolt and bearing laterally against the plate and retaining the same against lateral movement, said plate having at its edges oppositely-disposed curls spaced apart at their inner ends, a loop passing around the nut and having at one side laterally-disposed parallel shanks which pass through the space between the inner ends of the curls, said shanks at intermediate points being upwardly bowed, and near their ends being downwardly bowed, a pin passing through the curls and bearing against the upwardly-bowed portions of the said loop-shanks.

In testimony that I claim the foregoing as my own I have hereto affixed my signature in the presence of two witnesses.

ISAAC N. RIFE.

Witnesses:
 H. L. MUNDAY,
 HARRY S. WOODWARD.